United States Patent Office 3,474,152
Patented Oct. 21, 1969

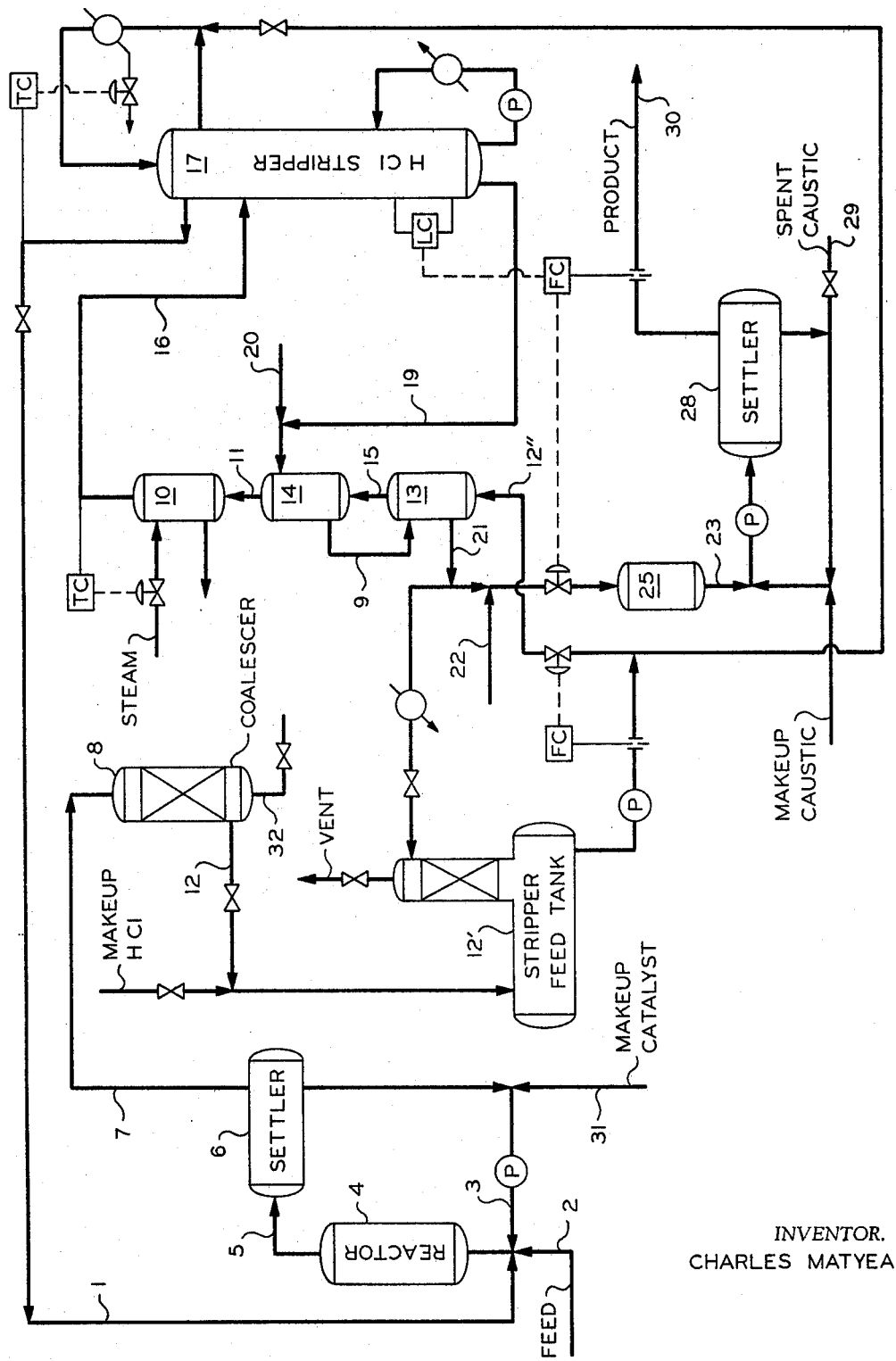

3,474,152
HYDROCARBON PROCESS
Charles Matyear, Sweeny, Tex., assignor to Phillips Petroleum Company, a corporation of Delaware
Filed May 22, 1967, Ser. No. 640,174
Int. Cl. C07b 27/00; C07c 5/28; B01j 11/78
U.S. Cl. 260—666
6 Claims

ABSTRACT OF THE DISCLOSURE

Deposition of aluminum chloride from hydrocarbon solutions thereof in process equipment is prevented and deposits of aluminum chloride and aluminum oxide, which result from such deposition, are removed by the addition of dimethylformamide.

BACKGROUND

Numerous hydrocarbon conversion processes employ catalysts which comprise, at least in part, aluminum chloride. Such processes are, for example, the isomerization of hydrocarbons and alkylation of hydrocarbons. The amounts of aluminum chloride employed usually exceeds the amount which will dissolve in the hydrocarbon phase at operating conditions prevailing in at least some part of the process. As a result, extensive effort has been devoted to the separation of the aluminum chloride from the hydrocarbon phase immediately following the reaction zone to prevent fouling of the equipment downstream of the reactor.

However, such separation procedures require considerable expense and are not effective in providing a sufficient degree of purification of a hydrocarbon phase to eliminate the prospect that further dissolution of aluminum chloride will result downstream of the point of separation.

It has also been disclosed by Dr. Willy Braun in German Patent 878,647 that effective solvents for anhydrous aluminum chloride comprises compounds of the general structure $X_1$—CO—$X_2$, in which $X_1$ can mean hydrogen, halogen, an alkyl group or an amide group and $X_2$ an amide group or even an O-metal group in case $X_1$ is hydrogen, are excellent solvents in chemical reactions. Dr. Braun further discloses that as well as being favorable solvents for aluminum chloride, numerous of these compounds are not exceptionally detrimental to the conduct of numerous widely dissimilar reactions.

For example, in the isomerization of hydrocarbons in the presence of aluminum chloride and hydrogen chloride, a major portion of the aluminum chloride is separated from the hydrocarbon phase immediately downstream of the reaction zone at a relatively elevated temperature. Consequently, a substantial amount of aluminum chloride remains dissolved in the hydrocarbon phase and is passed along with hydrocarbon to purification facilities downstream of the separation zone. I have found that when the temperature of this hydrocarbon phase containing dissolved aluminum chloride is further reduced or when the hydrocarbon phase is futher concentrated by removal of hydrogen chloride that some precipitation of aluminum chloride results. This material, along with aluminum oxide which is either initially present in the hydrocarbon or aluminum chloride phase or is formed from aluminum chloride during some phase of the process, crystallizes or deposits in some manner on the interior walls of the process equipment with numerous deleterious results such as increased pressure drop, decreased heat transfer efficiency, plugging of valves and other control apparatus, etc.

It is, therefore, one object of this invention to provide an improved process for the conversion of hydrocarbons in the presence of aluminum chloride. It is another object of this invention to provide a method for preventing the formation of deposit of aluminum chloride or aluminum oxide in processing equipment. It is another object of this invention to provide a method for removing aluminum chloride and aluminum oxide deposits from process equipment.

SUMMARY

In accordance with one embodiment of this invention, dimethylformamide is admixed with a hydrocarbon stream containing aluminum chloride to prevent the deposition of aluminum chloride which would otherwise result due to process conditions downstream from the point of admixture. In accordance with another embodiment of this invention, aluminum chloride deposits in process equipment are removed by admixing dimethylformamide with hydrocarbon process fluid upstream of the deposits to be removed.

DESCRIPTION

A more comprehensive understanding of the concept of this invention can be obtained by reference to the drawing, which is a schematic representation of the application of this invention to a process involving the isomerization of hydrocarbons.

Referring now to the drawing, a hydrocarbon stream comprising, for example, normal hexane and methylcyclopentane to be isomerized to isomeric paraffinic hexanes and cyclohexane, respectively, is introduced into isomerization reactor 4 by way of pipe 2. Recycled hydrogen chloride, from hereinafter detailed HCl stripper 17, is introduced into reactor 4 by way of pipe 1, and recycled aluminum chloride complex catalyst (along with makeup catalyst 31) is introduced into reactor 4 by way of pipe 3. Reactor effluent is passed by way of pipe 5 to phase separator or settler 6 wherein undissolved aluminum chloride catalyst separates from the hydrocarbon and is recycled to reactor 4 by way of pipe 3. The hydrocarbon phase comprising HCl and entrained aluminum chloride catalyst is passed by way of pipe 7 into coalescer 8 wherein remaining undissolved or suspended fine droplets of aluminum chloride catalyst are coalesced and removed by way of pipe 32. The hydrocarbon phase containing hydrogen chloride and dissolved aluminum chloride catalyst is passed by way of pipe 12 into HCl stripper feed tank 12'. Make-up HCl can be added to the system at this locus. The hydrocarbon phase from surge tank 12' is passed by way of pipe 12" to feed-bottoms indirect heat exchanger 13 and by way of pipe 15 to feed-bottoms indirect heat exchanger 14. The thusly heated feed leaving heat exchanger 14 is passed to preheater 10 by way of pipe 11 wherein it can be further heated to the desired temperature. The thusly heated feed is charged by way of pipe 16 into the HCl stripper 17 at an intermediate section thereof. Separated hydrogen chloride is removed from the upper section of stripper 17 by way of conduit 1 and is recycled to reactor 4. Bottoms product is removed by pipe 19 and is passed to indirect heat exchange with feed in exchanger 14 and by way of pipe 9 with heat exchanger 13, from which it exits by way of pipe 21. The temperature of this bottoms product is further reduced by indirect heat exchanger 25, from which it exits by way of pipe 23 and is passed to conventional aqueous NaOH (caustic) washer 28 for removal of the final traces of aluminum chloride and aluminum oxide. Product comprising isomeric hexanes and cyclohexane is removed by way of pipe 30 for further processing such as fractionation into desired components.

Due to the combined effect of the concentration of aluminum chloride in the hydrocarbon phase during fractionation in the HCl stripper 17 and the reduction in temperature of the hydrocarbon phase which occurs in heat exchangers 13 and 14, and in cooler 25, a portion of dissolved aluminum chloride is caused to precipitate from the hydrocarbon and deposits in the heat exchangers 13 and 14, cooler 25, or process lines in communication therewith. The separated aluminum chloride deposits on the walls or tubes of the cooler and heat exchangers, resulting in the formation of scale which causes increased pressure drop through this process equipment as well as resulting in inefficient heat exchange.

In order to overcome these problems, dimethylformamide was injected by way of pipe 20 into the bottoms stream 19 upstream of heat exchanger 14. This injection of dimethylformamide decreases the amount of aluminum chloride (and aluminum oxide) scale to decrease the pressure drop across the exchangers and increase the heat exchange efficiency. Although intermittent injection of dimethylformamide to remove scale from the exchangers is adequate to maintain desired heat transfer rates, depending upon the amount of scale or deposit, it may be desirable to add a small amount of dimethylformamide continuously by way of pipe 20, upstream of exchanger 14, and, as necessary, by way of pipe 22 upstream of water cooler 25.

SPECIFIC EXAMPLE

With no deposits in exchangers 13 and 14, the overall heat transfer coefficients K for these feed-bottoms exchangers were 135 (B.t.u./hr./sq. ft./° F.). With heavy deposits of aluminum chloride-aluminum oxide, these coefficients dropped to about 25 (B.t.u./hr./sq. ft./° F.).

With the exchangers at their K value of 25, that is, at their dirtiest or highest deposit condition, the feed was not sufficiently preheated and the steam load to heater 10 had to be increased by 4,400 pounds per hour, the equivalent of over $10,000 per year added steam costs. The addition of dimethylformamide in accordance with this invention maintains the desired high K, eliminating this added steam cost.

Without the on-stream cleaning of this invention, at least one day a month would be required to clean these exchangers while the unit is down, or not fully producing desired hydrocarbon product.

Operating conditions—

Reactor 4:
　Pressure, p.s.i.g. _____ 165
　Temperature, ° F. _____ 160
　Contact time, hours _____ 0.5
　Catalyst/hydrocarbon, vol. ratio _____ 1:1

Settler 6:
　Pressure, p.s.i.g. _____ 160
　Temperature, ° F. _____ 160

Stripper feed tank 12':
　Pressure, p.s.i.g. _____ 145
　Temperature, ° F. _____ 159

HCl stripper 17:
　Pressure, p.s.i.g. _____ 190
　Temperature, ° F.
　　Top _____ 266
　　Bottom _____ 365

Temperatures of streams, ° F.:
　Conduit 19 _____ 365
　Conduit 9 _____ 337
　Conduit 21 _____ 255
　Conduit 23 _____ 112
　Conduit 16 _____ [1] 320

Stream flows:
　Feed 2—
　　Total B/H _____ 250
　　Composition, vol. percent:
　　　Isohexanes _____ 8
　　　Normal hexane _____ 53
　　　Methylcyclopentane _____ 30
　　　Cyclohexane _____ 9

Recycle aluminum chloride complex 3:
　Barrels/hour _____ 250

Bottoms product 19[2]:
　Total B/H _____ 250
　Composition, vol. percent:
　　Isohexanes _____ 39
　　Normal hexane _____ 23
　　Methylcyclopentane _____ 9
　　Cyclohexane _____ 29

[1] With a constant flow of feed 16 and a constant steam condensing temperature in 10, at K of about 135, the feed 16 is heated to 320° F. When K falls off to about 70, the feed is heated to but about 295° F.
[2] Contains aluminum chloride and aluminum oxide.

Using the above flow rates and conditions, dimethylformamide was injected at the rate of one barrel per hour for a two hour period to clean the exchangers 13, 14 (and 25). This results in an increase of a K from about 25 to about 135.

This cleanup is effected intermittently between two to three times per week (depending upon demand for more steam for exchanger 10 which means the K values of 13 and 14 are decreasing). Usually the K is maintained at least above about 120 B.t.u./hr./sq. ft./° F. for desired operation for exchangers 13 and 14.

The amount of scale which deposits in any period of time, as well as the amount of dimethylformamide addition required to inhibit such deposition or remove deposits, depends of course on operating conditions and the amount of aluminum chloride carryover from HCl stripper 17. Similar results can be accomplished by adding the dimethylformamide upstream of HCl stripper 17, for example, in pipe 12 or even upstream of reactor 4. However, since the problem sought to be prevented exists primarily in the processing of the HCl stripper bottoms product, it is usually preferable that the dimethylformamide be added downstream of fractionator 17 with, of course, the provision that the injection point be upstream of the location at which deposits form or might tend to form.

It should also be noted that the addition of dimethylformamide to the isomerization product as above-noted results in no deleterious effect on the ultimate product removed by way of pipe 30 from caustic treatment in vessel 28 in that essentially all of the dimethylformamide is removed from the hydrocarbon phase in the treater 28, and, therefore, exits this system along with the spent caustic by way of pipe 29.

I claim:

1. In the conversion of hydrocarbons by alkylation and isomerization by contacting said hydrocarbons with hydrogen chloride and a catalyst consisting essentially of aluminum chloride to convert the hydrocarbons and form a resulting reaction phase containing hydrocarbon products having hydrogen chloride and aluminum chloride dissolved therein, at least a portion of said resulting reaction phase being cooled prior to removal of the last traces of aluminum chloride catalyst, which cooling reduces the solubility of said aluminum chloride and results in the formation of deposits comprising aluminum chloride and aluminum oxide which deposits foul processing equipment, the step of minimizing precipitation and the formation of processing equipment fouling deposits comprising aluminum chloride and aluminum oxide during said temperature reducing comprising adding dimethylformamide to the hydrocarbon phase containing dissolved aluminum chloride prior to said temperature reducing in an amount sufficient to cause solid aluminum chloride to solubilize and maintain the aluminum chloride in solution, thereby substantially preventing the formation of fouling deposits and at the same time removing deposits already present in the system by solubilizing solid deposits comprising aluminum chloride and aluminum oxide.

2. The process of claim 1 wherein:
(a) said reaction phase comprising hydrocarbon product, aluminum chloride and hydrogen chloride is passed to a quiescent settling zone to separate undissolved aluminum chloride,
(b) removing a hydrocarbon phase essentially free of undissolved aluminum chloride from said settling zone and passing same to a fractionation zone to produce an overhead product comprising hydrogen chloride and a bottoms product comprising hydrocarbon product and dissolved aluminum chloride,
(c) reducing the temperature of said bottoms product prior to treating same to remove final traces of aluminum chloride catalyst therefrom, the temperature of said bottoms product being reduced to a point at which a portion of said dissolved alumnium chloride and aluminum oxide separate from said hydrocarbon and deposit on the interior walls of process equipment, and
(d) admixing said dimethylformamide with said bottoms product upstream at the point at which said aluminum chloride deposits are formed in an amount sufficient to redissolve deposited aluminum chloride and aluminum oxide.

3. The process of claim 2 wherein the hydrocarbons to be converted comprise normal hexane and methylcyclopentane which are isomerized to form said reaction phase comprising paraffinic hexanes, cyclohexane, hydrogen chloride and dissolved aluminum chloride catalyst and said undissolved aluminum chloride separated in (a) is recycled to said isomerization.

4. The process of claim 3 wherein the amount of dimethylformamide added to said bottoms product is at the rate of one barrel per hour per 250 barrels per hour total bottoms product, the addition of dimethylformamide being intermittent and being at about 2 to 3 times per week based upon a continuous operation of the isomerization process.

5. In the isomerization of isomerizable hydrocarbons comprising the steps of:
(a) contacting said hydrocarbons with an isomerization catalyst consisting essentially of aluminum chloride and HCl,
(b) separating the effluent from said contacting into
 (1) a catalyst phase comprising undissolved aluminum chloride complex catalyst, and
 (2) a hydrocarbon phase containing HCl and entrained, dissolved aluminum chloride catalyst,
(c) passing said hydrocarbon phase to a stripping zone wherein HCl is taken overhead and a hydrocarbon phase containing dissolved aluminum chloride and aluminum oxide is removed as bottoms,
(d) reducing the temperature of said bottoms,
(e) treating said bottoms with caustic to remove aluminum chloride catalyst therefrom, and
(f) recovering said bottoms as product, the step of
(g) minimizing precipitation and the formation of processing equipment fouling deposits comprising aluminum chloride and aluminum oxide during said temperature reducing step by adding dimethylformamide to said bottoms containing dissolved aluminum chloride prior to said temperature reducing in an amount sufficient to cause solid aluminum chloride to solubilize and maintain the aluminum chloride in solution, thereby substantially preventing the formation of fouling deposits and at the same time removing deposits already present in the system by solubilizing solid deposits comprising aluminum chloride and aluminum oxide.

6. The process of claim 5 wherein the feed to be isomerized comprises normal hexane and methylcyclopentane which are isomerized to isomeric paraffinic hexanes and cyclohexanes and the amount of dimethylformamide added is at the rate of about one barrel per hour per 250 barrels per hour of bottoms product and which addition is effected intermittently at about two to three times per week which is sufficient to clean up the heat exchange zones used to reduce the temperature of said bottoms and increase the heat exchange efficiency of said heat exchange zones.

References Cited
UNITED STATES PATENTS

| | | | |
|---|---|---|---|
| 3,219,546 | 11/1965 | Fannin. | |
| 2,962,487 | 11/1960 | Coover | 260—93.7 |
| 3,018,278 | 1/1962 | Shearer | 260—93.7 |
| 3,225,020 | 12/1965 | Coover | 260—93.7 |

OTHER REFERENCES

Chemical Abstracts 50:4230a, 1956.

DELBERT E. GANTZ, Primary Examiner

V. O'KEEFE, Assistant Examiner